Nov. 27, 1962   R. A. BURGY   3,065,823
ELEVATOR CONTROLS BASED ON PASSENGER TRANSFERS
Filed Aug. 3, 1959   8 Sheets-Sheet 1
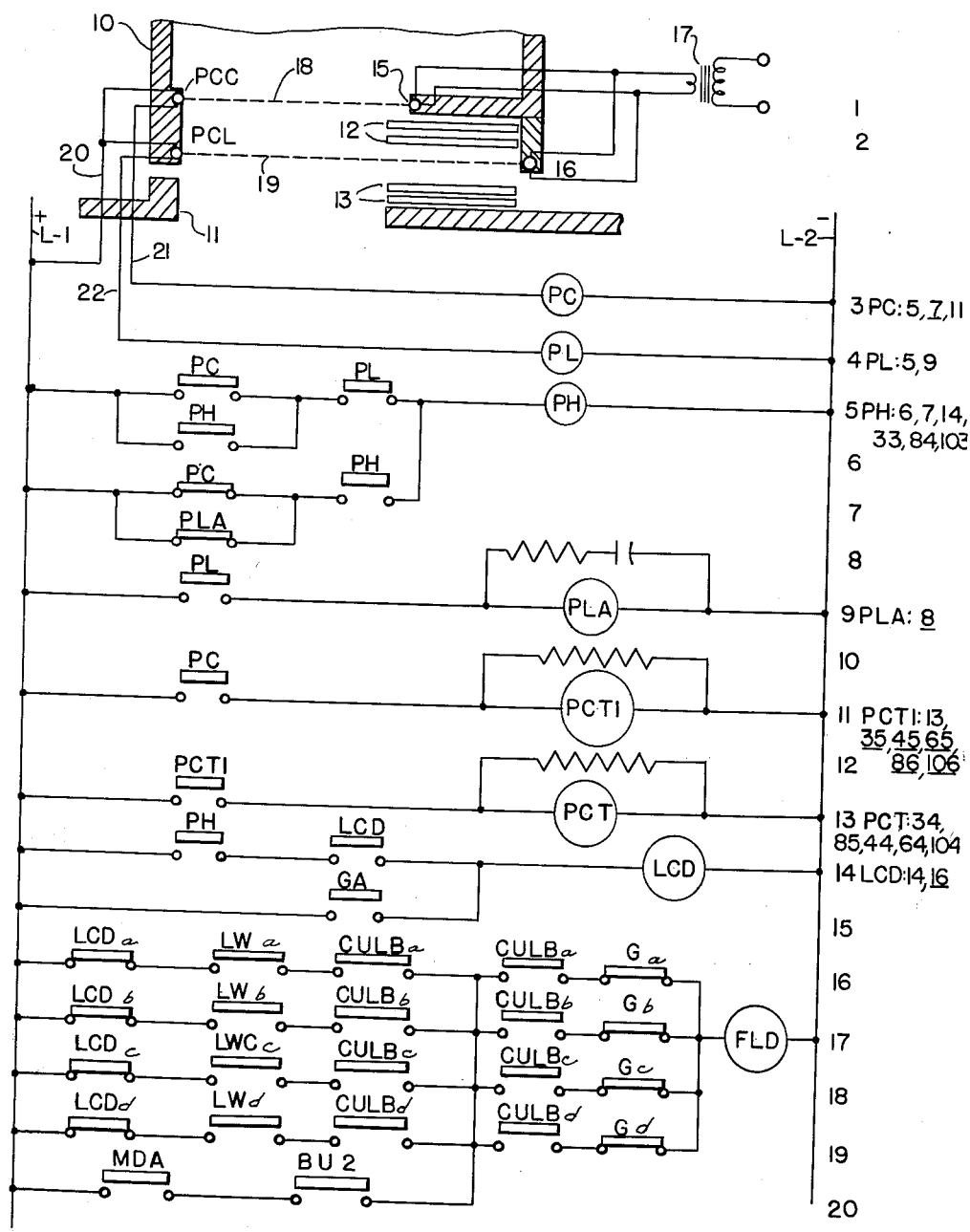
Fig I
INVENTOR.
RAYMOND A. BURGY
BY
Marshall, Marshall & Yeasting
ATTORNEYS

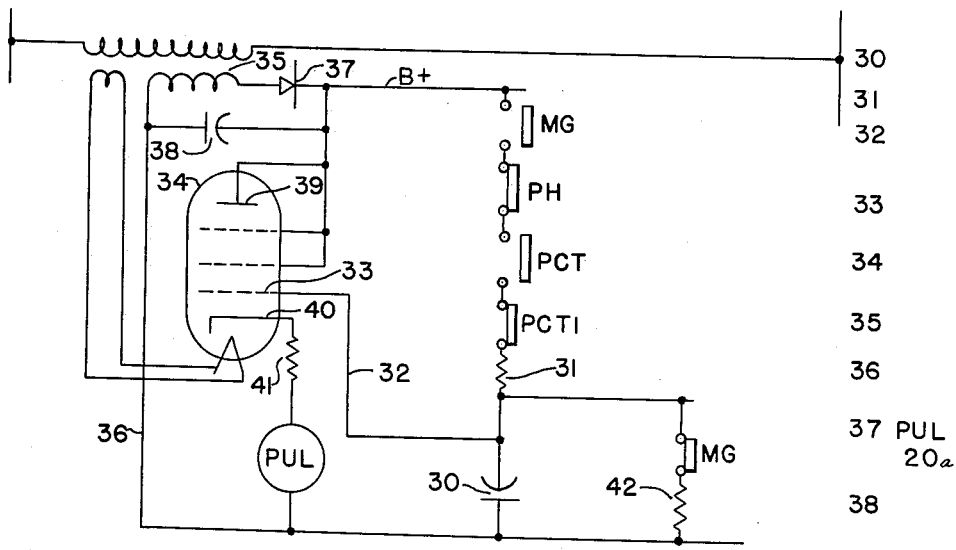
*Fig. II*
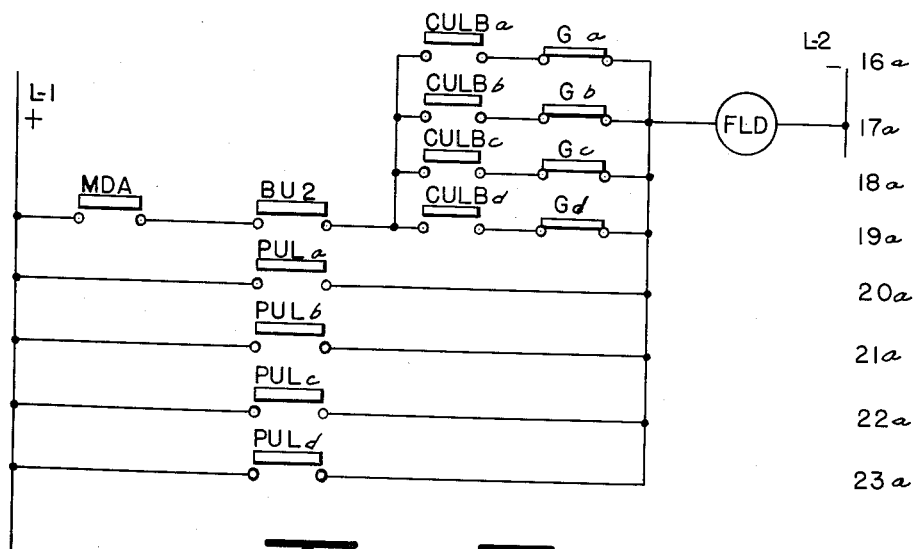
*Fig. III*

Nov. 27, 1962
R. A. BURGY
3,065,823
ELEVATOR CONTROLS BASED ON PASSENGER TRANSFERS
Filed Aug. 3, 1959
8 Sheets-Sheet 3
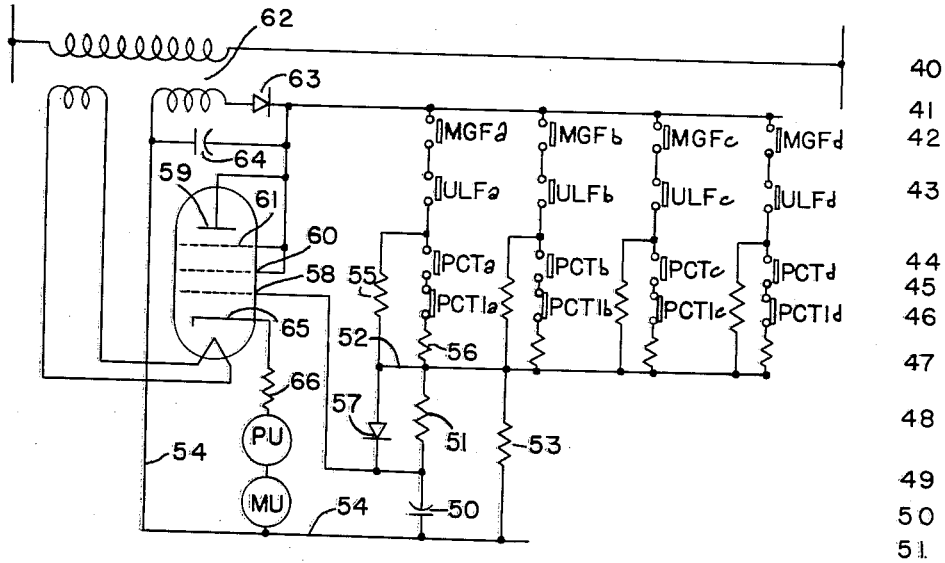
*Fig IV*
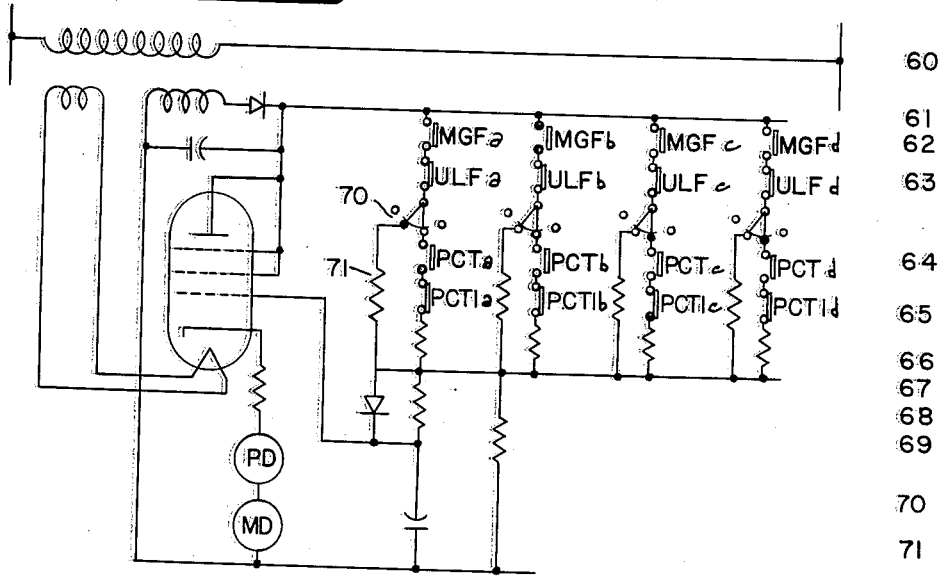
*Fig V*
INVENTOR.
RAYMOND A. BURGY
BY
Marshall, Marshall & Yeasting
ATTORNEYS Nov. 27, 1962
R. A. BURGY
3,065,823
ELEVATOR CONTROLS BASED ON PASSENGER TRANSFERS
Filed Aug. 3, 1959
8 Sheets-Sheet 4
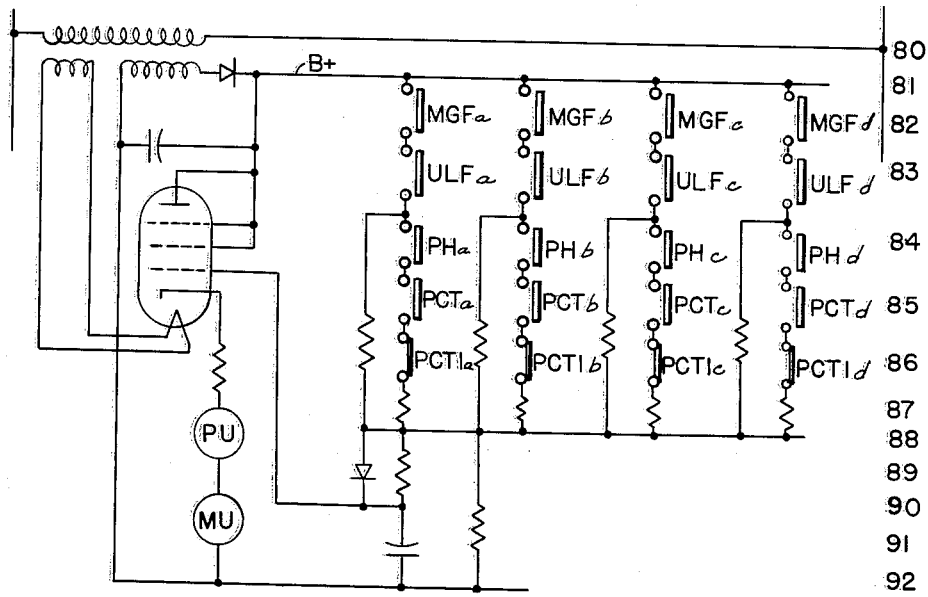
*Fig VI*
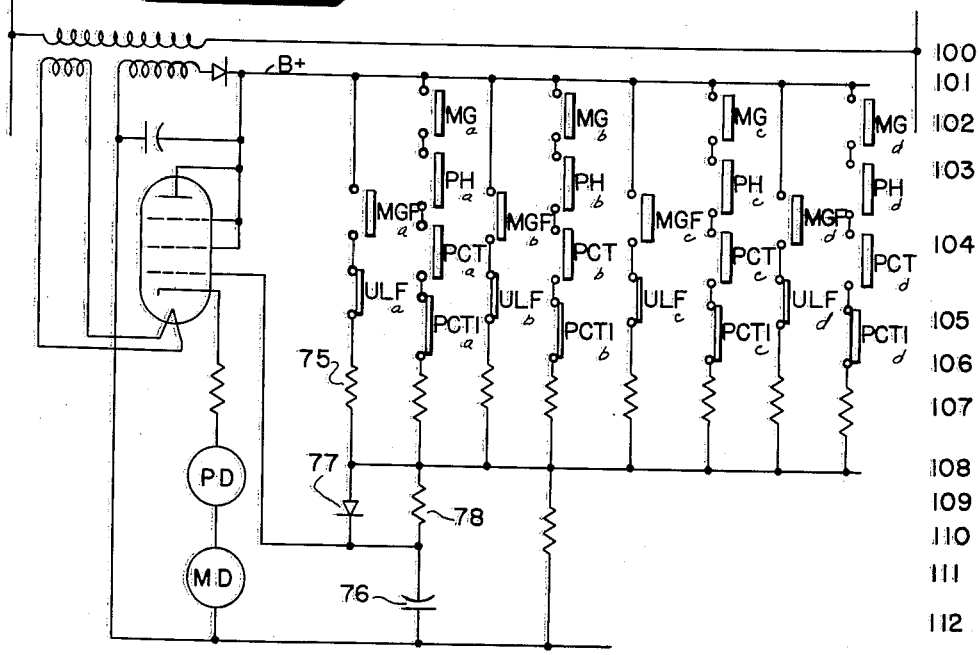
*Fig VII*
INVENTOR.
RAYMOND A. BURGY
BY
Marshall, Marshall & Yeasting
ATTORNEYS

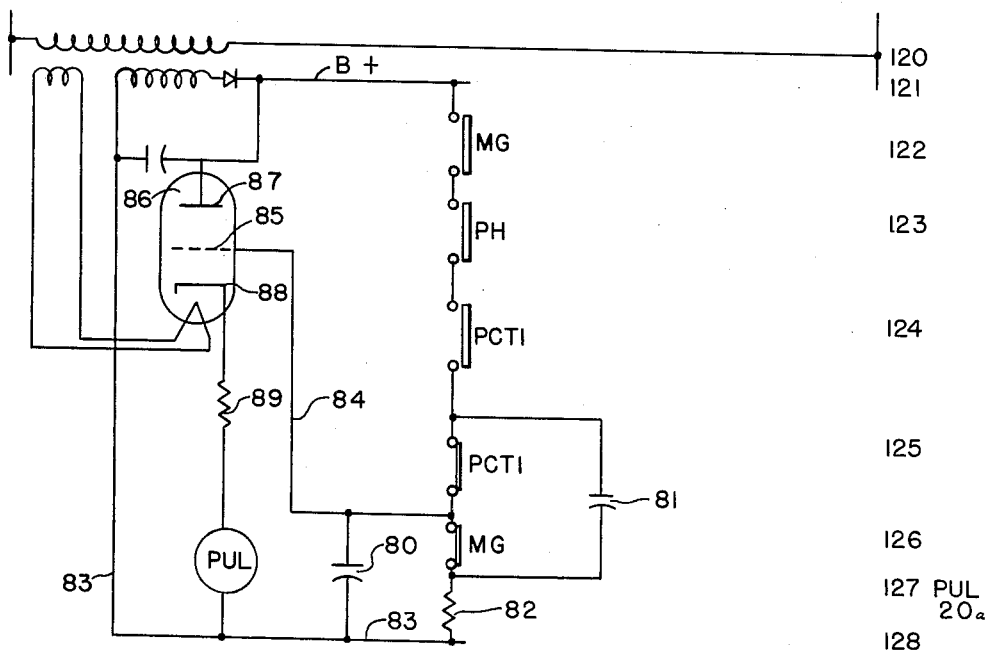
Fig VIII
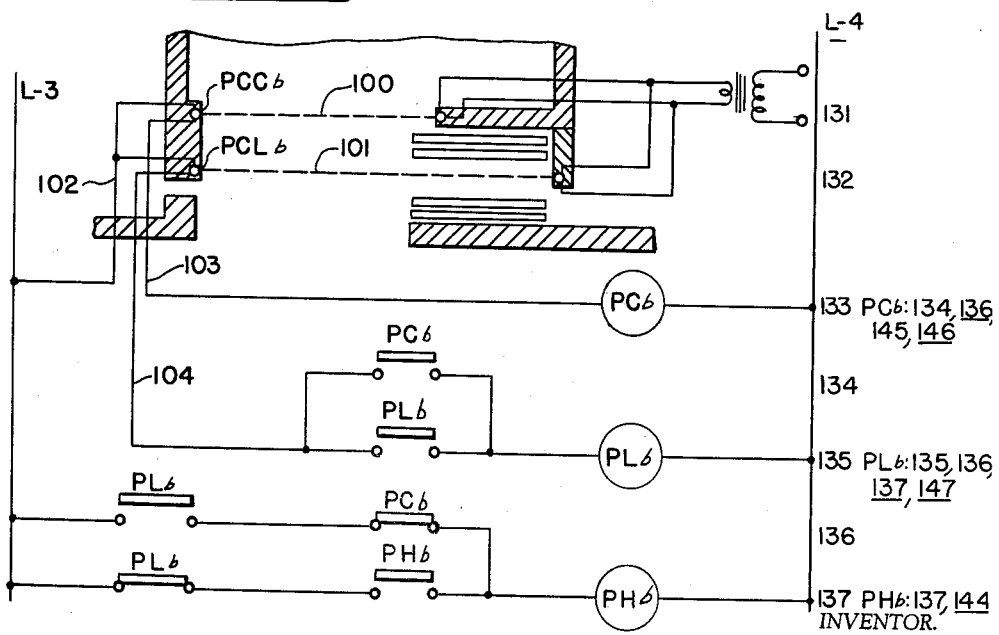
Fig IX
INVENTOR.
RAYMOND A. BURGY
BY
Marshall Marshall Yeasting
ATTORNEYS

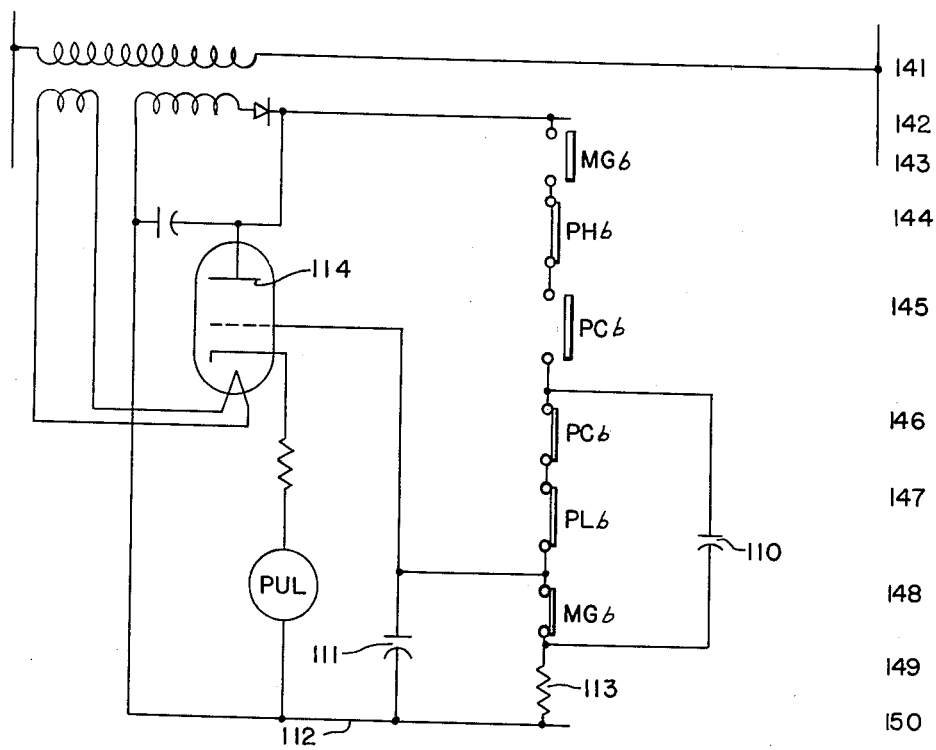
Fig. X

Nov. 27, 1962   R. A. BURGY   3,065,823
ELEVATOR CONTROLS BASED ON PASSENGER TRANSFERS
Filed Aug. 3, 1959   8 Sheets-Sheet 7
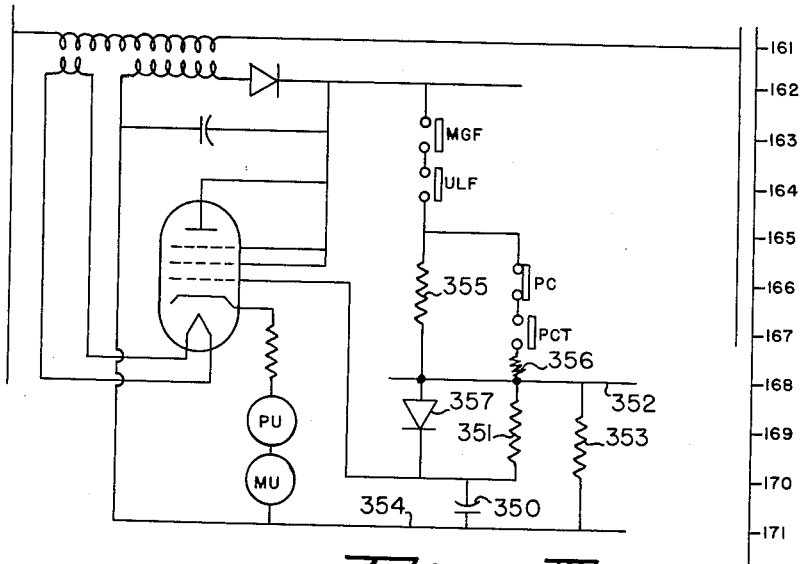
Fig-XI
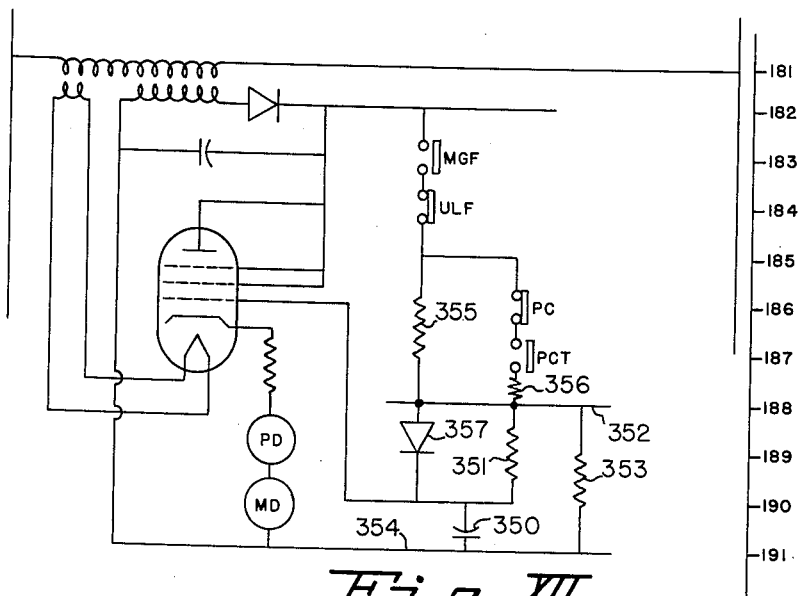
Fig-XII
INVENTOR.
RAYMOND A. BURGY
BY
Marshall, Marshall & Yeasting
ATTORNEYS

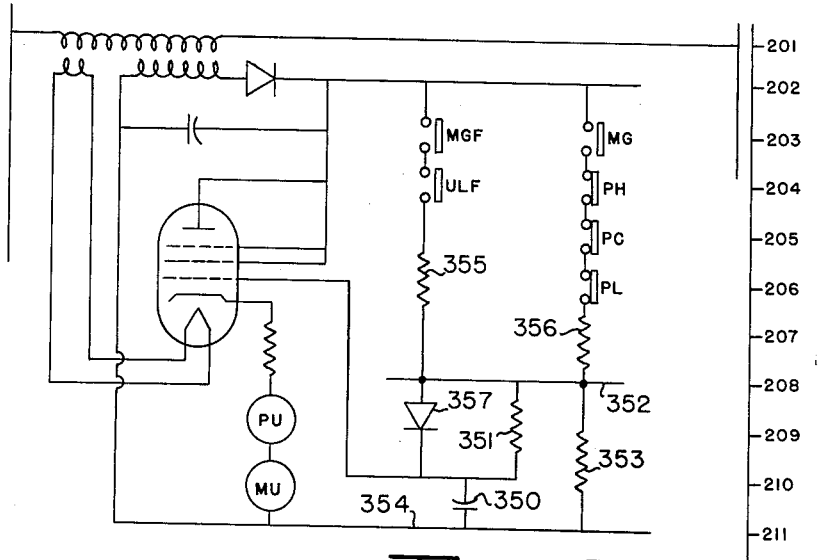
Fig. XIII
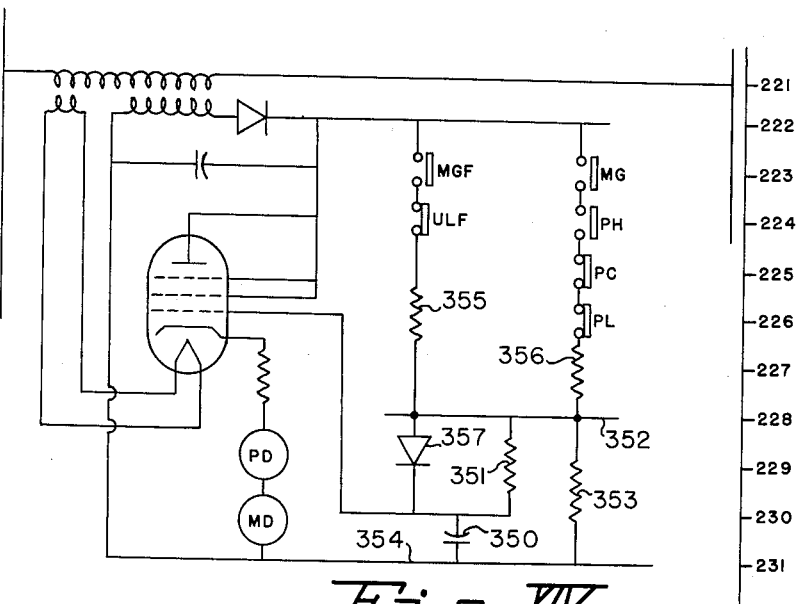
Fig. XIV
INVENTOR.
RAYMOND A. BURGY

United States Patent Office 3,065,823
Patented Nov. 27, 1962

3,065,823
ELEVATOR CONTROLS BASED ON
PASSENGER TRANSFERS
Raymond A. Burgy, Maumee, Ohio, assignor to Toledo
Scale Corporation, Toledo, Ohio, a corporation of Ohio
Filed Aug. 3, 1959, Ser. No. 831,432
30 Claims. (Cl. 187—29)

This invention relates to automatic elevators and in particular to means for controlling the operation of a bank of automatic elevators in accordance with the number of passenger transfers to or from the elevator cars during selected time intervals. The present application is a continuation-in-part of the parent application Serial No. 718,016, now abandoned.

The demand for elevator service in different classes of buildings varies widely during different periods of the day as well as from day to day. In an ordinary office building the demand for elevator service is often classified into four groups or classes of service commonly known as up peak, off peak, down peak, and intermittent or night service. The up peak demand occurs just before the start of a business day when the building tenants or occupants are arriving. After most of the tenants have arrived the demand subsides to an off peak demand with nearly balanced up and down traffic during the working hours. During the noon lunch period many of the occupants leave the building so there is a short period of heavy down traffic or down peak operation almost immediately followed by another up peak demand as the tenants return from lunch. During the afternoon an off peak program serves the ordinary balanced demand and then at the close of the business day there is usually another period of down peak demand. After this demand is satisfied and the offices are closed, there follows a period of light or intermittent demand during the evening and night hours during which a few of the building tenants may be entering or leaving and building maintenance personnel are using the elevators while going about their work. The traffic demand on holidays and Sundays is generally the same as the night demand since there are very few people using the cars.

For efficient service it is necessary to change the operating pattern or program of a group of elevators as each type of traffic demand occurs. In the past it has been the custom to provide various patterns and to select the patterns either in accordance with the demand as observed by a supervisor stationed at the main floor, or to introduce the various patterns automatically at preselected times by means of a time clock in accordance with anticipated demands. Each of these arrangements suffers from disadvantages. The first, the one requiring the services of a human supervisor, often is not switched to the proper program because of the inattention of the supervisor. Furthermore, it is expensive to require a supervisor to devote a large part of his time to observing the system when there are no changes occurring that require a response on his part. The second system employing the clock to change the pattern at anticipated times is unsatisfactory in many locations because it is unable to cope with sudden changes in demand occurring at unexpected times.

The principal object of this invention is to control the operation of a bank of elevators in accordance with the number of passenger transfers to or from the car.

Another object of the invention is to provide means for changing the program selection of a bank of elevators in accordance with the rate of passenger transfers with respect to time.

Another object of the invention is to provide means for accelerating the dispatch of a car from a terminal floor in accordance with the number of passenger entries into the car.

Another object of the invention is to provide means for counting the number of passenger transfers and for distinguishing between passenger entries and passenger departures from the car.

Another object of the invention is to provide means for minimizing the response of the system to intentional interference with portions of the counting mechanism.

Still another object of this invention is to provide means for integrating the total transfer time of passengers at a floor and changing the program selection of a bank of elevators in accordance therewith.

A still further object of this invention is to provide means for measuring the time of passenger transfer at terminal floors and differentiating between entering and leaving passengers.

These and other objects and advantages are obtained in a structure constructed according to the invention.

According to the invention the selection of operating programs, the control of load or timed dispatching, or both are controlled in accordance with the number of passenger transfers or the totaled transfer time of passengers occurring during selected times either taken alone or in conjunction with the integrated time that the cars are stopped at intermediate floors while serving traffic to or from those floors.

Control equipment for operating an elevator system in accordance with the invention is illustrated in the accompanying drawings.

In the drawings:

FIG. I is a schematic diagram of equipment for detecting the entrance or exit of one or more passengers into or from the car and generating control signals in accordance therewith.

FIG. II is a circuit illustrating one method of accelerating the dispatch of a car in response to the number of passengers entering the car.

FIG. III is a fragmentary circuit diagram illustrating a modification of the circuit of FIG. I arranged to use information obtained from the circuit shown in FIG. II.

FIG. IV is a circuit diagram showing means for selecting programs or patterns of operation in accordance with the time that the cars stop at intermediate floors for passenger transfers and the number of transfers that actually take place.

FIG. V shows a circuit similar to that shown in FIG. IV arranged so that the program selection may be either in accordance with the time that the cars are stopped at intermediate floors on a particular trip, according to the number of passengers that enter the car or leave the car, or according to a combination of the two previous quantities.

FIG. VI is a circuit similar to that shown in FIG. IV except that only departing passenger transfers are counted.

FIG. VII is a circuit similar to FIG. V except that the passenger counting is limited to passengers leaving at the main floor.

FIG. VIII is a circuit control similar to that shown in

FIG. II but for counting departing passengers and employing a different method of counting.

FIG. IX is a circuit diagram similar to FIG. I showing a different arrangement of relays for accomplishing the same passenger transfer detecting functions.

FIG. X is a circuit diagram similar to FIG. II illustrating an alternative form of circuit for minimizing the response of the passenger detecting means to intentional interference.

FIG. XI is a circuit diagram similar to that shown in FIG. IV arranged so that program selection may be in accordance with the transfer time of passengers at intermediate floors while the car is traveling upward.

FIG. XII is a circuit diagram similar to that shown in FIG. XI except that the time of passenger transfer is measured while the car is traveling downward.

FIG. XIII is a circuit diagram similar to that shown in FIG. XI arranged so that program selection may be in accordance with the transfer time of entering passengers at terminal floors.

FIG. XIV is a circuit diagram similar to that shown in FIG. XIII except that only the transfer time of existing passengers is measured.

These specific figures and the accompanying description are intended merely to illustrate the invention and not to limit its scope.

In the following description the term "passenger" is intended to include any person or object that is transported in an elevator car. The term "passenger transfer" means any movement of a passenger to or from the car. In the description, since there can be no confusion between a relay operating coil and its contacts, the relay operating coils are given distinctive letter designations and the contacts operated by each coil are given similar letter identifications. As an aid to identifying the contacts operated by each coil a code is included along the right side of each diagram listing, opposite each operating coil, the diagram line numbers at which the contacts operated at such coil are located. Underscored line numbers indicate normally closed contacts.

In any elevator system in which the pattern of operation is to be controlled according to the number and direction of the passenger transfers it is necessary to provide some means for counting the number of passengers entering or leaving the car as well as determining the direction in which they are moving. Many types of passenger detecting devices may be employed for this purpose. Such devices include pairs of treadles mounted in the floor at the doorway of the car, electrostatic detectors similarly located, means for detecting changes in weight of the elevator car as a passenger steps into or from the car, and radiant energy beams directed across the doorway of the car in a position to be interrupted by a passenger entering or leaving. This latter from of detecting mechanism is preferred and is the type employed in the system illustrated in the figures. The detecting mechanism may be mounted on the elevator car or in the hallway door leading from the hall into the car. The location on the car is preferred since in such location the same detecting means is effective at each floor served by the car whereas if the detecting means is located in the hallway door separate means must be employed at each floor.

In the system shown in FIG. I an elevator car 10 is shown in plan as being located adjacent a hallway door 11 with its car doors 12 retracted to open position. Hall doors 13 are also open to allow passage to or from the elevator car and the adjacent hallway.

A pair of radiant energy sources 15 and 16 that are energized through a transformer 17 connected to a source of alternating current power project beams 18 and 19 of radiant energy across the doorway of the elevator car to a pair of energy receivers such as photocell receivers PCC and PCL. The photocell receivers PCC and PCL, which are responsive to the radiant energy beams 18 and 19 respectively, include relay contacts arranged to complete circuits from a positive direct current voltage line L1 through lead 20 to the receivers PCC and PCL and from the receivers through leads 21 and 22 to car and landing photo relays PC and PL respectively shown in lines 3 and 4 of the diagram. The landing photo relay PL responds to that beam of the pair of beams 18 and 19 which is nearer the landing regardless of whether its receiver PCL is on the car or on the landing. The contact arrangement in the receivers PCC and PCL is such that as long as the radiant energy beams 18 and 19 are unobstructed the relays PC and PL are energized.

Energization of relays PC and PL in lines 3 and 4 cause them to close their contacts PC and PL in line 5 to complete a circuit from the positive lead L1 through these contacts and an operating coil of a direction sensing relay PH to a return line L2. The direction sensing relay PH thereupon closes its contacts PH in line 6 so as to complete a by-pass circuit around the PC contacts in line 5. The landing photo relay PL in line 4, when energized, also closes its contacts PL in line 9 to complete the circuit to a landing auxiliary photo relay operating coil PLA in line 9. The landing auxiliary photo relay PLA when energized opens its contacts PLA in line 8 and when deenergized closes these contacts so as to, in cooperation with the car photo relay PC, complete or prepare a circuit in line 7 through normally open contacts of the direction sensing relay PH to provide a sealing circuit for the direction sensing relay PH.

In this arrangement the car photo relay PC in line 3 and the landing photo relay PL in line 4 are deenergized in overlapping succession as a passenger enters or leaves the car. These relays, since they operate each time a passenger enters, may be used directly with counting equipment to count the number of passenger transfers. The sequence with which the landing and car photo relays PL and PC are deenergized determines whether or not the direction sensing relay PH remains energized or is deenergized as a passenger enters or leaves. Assuming first that a passenger is entering the car, the radiant energy beam 19 is interrupted first thereby deenergizing the landing photo relay PL. This relay, by opening its contacts in line 5, deenergizes the direction sensing relay PH so that it drops out and opens its contacts in lines 6 and 7. Therefore, when the passenger interrupts the car radiant energy beam 18 and drops out the car photo relay PC, the opening of its contacts PC in line 5 and closure of its contacts in line 7 has no effect on the direction sensing relay PH. Thus, this relay when in deenergized condition indicates that the passenger entered the elevator car. The direction sensing relay PH is reenergized the instant both photo relays PC and PL are simultaneously energized.

If the passenger is leaving the car the sequence of breaking the radiant energy beams 18 and 19 is reversed so that the car photo relay PC in line 3 is deenergized first followed in order by the deenergization of the landing photo relay PL in line 4. When the car photo relay PC drops out it opens its contacts PC in line 5 and closes its contacts PC in line 7. Since a moment earlier both photo relays were energized the direction sensing relay PH was also energized so as to close its contacts in lines 6 and 7. Therefore, the opening of the car photo contacts PC in line 5 has no effect since they are by-passed by the now closed contacts PH in line 6. Furthermore, closure of the car photo relay contacts PC in line 7 completes a sealing circuit through the direction sensing relay contacts PH in line 7 to maintain the direction sensing relay PH energized. The subsequent operation of the landing photo relay PL, by opening its contacts PL in line 9, deenergizes the landing auxiliary photo relay PLA so that it closes its contacts in line 8 to maintain the sealing circuit to the direction sensing relay PH when the car photo relay PC is reenergized as the passenger clears the beam 18.

Once this condition is established with the direction sensing relay energized through the circuit in line 7 it cannot be deenergized until both the car and landing photo relays PC and PL have been simultaneously energized to open the car photo relay contacts PC in line 7 and the auxiliary landing photo relay contacts PLA in line 8. The timing of the relays as a passenger leaves the car is not critical. However, there is one critical condition in the sequence for a passenger entering the car. This critical condition occurs at the moment the passenger interrupts the landing photo beam 19 deenergizing the landing photo relay PL. Since this relay opens its contacts in lines 5 and 9 simultaneously and since the direction sensing relay PH contacts are closed in line 7 it is necessary, if the direction sensing relay PH is to be deenergized, that the direction sensing relay PH operate faster than the landing auxiliary photo relay PLA in line 9. If the latter relay were to operate more rapidly it would close its contacts PLA in line 8 thus completing a sealing circuit to the direction sensing relay PH before that relay could open its contacts PH in line 7. To avoid this possibility the landing photo relay PLA is arranged to have a slower dropout time, which for example, may be accomplished by special coil design or merely providing a resistance-capacity circuit in parallel with the operating coil so as to maintain the energization for a brief moment after the contacts PL, in line 9, open.

In one form of counting circuit employed in the control of the elevators a charging circuit to a condenser is completed for a fixed interval of time for each passenger that enters or leaves the car regardless of the length of time taken by the passenger to complete such entry or exit. In this circuit it is also desirable to prevent false operation such as false counts by a person waving his hand across the radiant energy beam 18 so as to produce a number of interruptions simulating passenger transfers. To guard against this last type of interference, circuits are provided so that the radiant energy beam must be broken for a certain length of time, somewhat less than the normal interruption time as a passenger enters or leaves, before the counting circuits respond to such interruption. This is accomplished by the relays shown in lines 11 and 13 of FIG. I. In line 11 a car photo timing relay PCT1 is energized through car photo relay contacts PC as long as the car photo relay is energized. When this beam is interrupted to deenergize the circuit the timing relay PCT1, of the flux decay variety, remains in its closed position for a prescribed length of time. Thus the circuit must be broken for this interval of time before any further response is produced. The timing relay PCT1 in line 11, when energized, closes its contacts in line 13 to energize a second car photo timing relay PCT. The counting circuits as indicated in FIGS. IV, V, VI or VII employ a series circuit including a normally closed set of contacts PCT1 of the first car photo timing relay PCT1 and a normally open set of contacts PCT of the second timing relay PCT. The circuit is completed through these contacts as long as the first timing relay PCT1 in line 11 has dropped out and until the second of the relays drops out. The circuit is thus controlled in time by the second timing relay PCT.

One feature of the invention is to control a load weighing device in a dispatch accelerating means so that the load weighing device is not effective when the car arrives at a terminal floor with a full load of passengers but becomes effective as soon as the passengers have left the car and one or more passengers have entered. The circuits for accomplishing this control function appear in lines 14–20 of FIG. I. As shown, a loaded car dispatch relay LCD in line 14 is energized when the car is approaching the main terminal by closure of gate contacts GA in line 15. The gate relays G and GA are in parallel and drop out when the gate is opened a predetermined distance from its fully closed position, usually a few inches. Since at this time the direction sensing relay PH is also energized by completion of the radiant energy beams 18 and 19, the energization of the loaded car dispatch relay LCD causes it to seal itself in through the normally open direction sensing relay contacts PH and the normally open dispatch relay contacts LCD in line 14. This relay thus remains energized after the car arrives at the main terminal as long as the passengers are leaving the car. As soon as the passengers have left and a passenger enters the car, the direction sensing relay PH is deenergized thus opening its contacts PH in line 14 to deenergize the loaded car dispatch relay LCD.

When the loaded car dispatch relay LCD, in line 14, is deenergized by such entry of the passenger into the car (assumed to be car $a$), it prepares a circuit such as the circuit in line 16 through its own back contacts LCD$a$; contacts LW$a$ of a load weighing device for the same car; through contacts CULB of a car selection relay system indicating, when closed, that the car is selected for loading; through another set of contacts CULB and normally open gate contacts G which are closed as long as the gate is open at the floor and thence through the full load dispatch relay FLD in line 17. When this circuit is completed and the full load dispatch relay is energized it acts to accelerate the dispatching mechanism to provide instantaneous or nearly instantaneous dispatch of the car. A similar set of contacts is included for each car in the system. Thus car $a$ has its contacts shown in line 16, car $b$ has its corresponding contacts appearing in line 17, car $c$ has its contacts in line 18, and car $d$ has its contacts in line 19. The full load dispatch relay FLD in line 17 may also be energized through a circuit in line 20 during a moderate or peak down traffic program, indicated by closure of contacts MDA in line 20, whenever there are two or more cars at the bottom terminal as indicated by closure of the contacts BU2 in line 20. Under these circumstances the dispatch interval is accelerated to send at least one of the cars away to keep the cars in operation rather than allowing them to stand idle at the main terminal when there is a substantial amount of traffic.

Full load dispatching may also be accomplished by counting the number of passengers entering a car and completing a circuit to the full load dispatch relay FLD as soon as the number of passengers reaches a certain figure. Circuits for operation according to this principle are illustrated in FIGS. II and III. The counting circuit in FIG. II comprises a condenser 30 of approximately 10 microfarads capacity that is charged in accordance with the number of passenger transfers by current flowing from a B+ lead at line 31 through a series arrangement of a normally open main floor relay contacts MG that is closed when a car is at the main terminal, normally closed contacts PH of the direction sensing relay PH, line 5 of FIG. I, normally open photocell timing relay contacts PCT, line 13 of FIG. I, normally closed photocell timing relay contacts PCT1, line 11 of FIG. I, and a current limiting resistor 31 of approximately four meghoms resistance. Charging current flows through this series of contacts from the B+ lead for a fixed interval of time for each passenger entry. The interval of time is fixed by the drop out time of the photocell timing relay PCT shown in line 13 of FIG. I.

Since any current drawn from the condenser 30 during the counting operation affects the accuracy of count the condenser voltage is applied through a lead 32 to a grid 33 of a high vacuum thermionic tube 34 connected as a cathode loaded amplifier. The amplifier is energized from the B+ lead by a power supply including a secondary winding 35 of a power transformer one terminal of which is connected to a negative return lead 36 from the condenser 30 and the other terminal of which is connected through a rectifier 37 to the B+ lead. A filter condenser 38 connected between the return lead 36 and the B+ lead provides a filtering or smoothing action to maintain a substantially constant direct current voltage between the return lead 36 and the B+ lead. Conventional current flow in the amplifier circuit is from the B+ lead through a plate 39 of the tube 34 to its cathode 40 and thence through a current adjusting resistor 41 and an operating coil of a counting relay PUL to the return lead 36. By adjusting the time constant of the resistance capacity circuit including the resistor 31 and condenser 30 or the adjusting resistor 41 for varying the current flow through the operating coil of the relay PUL in response to the cathode voltage developed at the cathode 40 of the tube the relay may be adjusted to respond to any desired number of passenger entries.

As soon as the car departs from the first floor so as to deenergize its main floor relay MG the relay opens its contacts MG at line 32 and closes its contacts at line 37 of FIG. II so as to complete a discharging circuit for the condenser 30 by way of a discharge resistor 42 connected between the contacts MG at line 37 and the return lead 36. The magnitude of the discharge resistor 42 is not critical and any resistance value large enough to prevent excessive current flow is satisfactory. For practical purposes a 5000 ohm resistor is quite satisfactory.

When the passenger entries are counted to determine the passenger load for dispatching purposes the circuits for the full load dispatch relay FLD shown at line 17 of FIG. I are modified according to the circuits shown in FIG. III. In this modification the circuits shown in lines 16a to lines 20a are substituted for the circuits in lines 16–20 of FIG. I and the circuits shown in lines 20a—23a inclusive are added. The circuits in lines 16a—20a are identical to those shown in the corresponding lines of FIG. I except for the omission of the load weighing device contacts, the loading car relay contacts LCD, and the load assignment contacts CULB arranged in series with the load weighing contacts. In place of those circuits counting relay contacts PUL shown for the various cars in lines 20a to 23a inclusive are substituted and these contacts, which close as soon as one of the counting relays PUL, shown in line 38 of FIG. II operates, complete a circuit direct from the positive lead L1 through the full load dispatch relay FLD to the return lead L2. Thus nearly instantaneous dispatch is provided as soon as a car receives the prescribed number of passengers.

The program or pattern of operation of the elevator system may be varied in accordance with the passenger demand by counting the number of passengers using the elevator system and using that count either alone or in conjunction with the time that the car stands at the intermediate floors during passenger transfer as the criterion for program selection. Circuits operating according to this aspect of the invention are illustrated in FIGS. IV and V. In the circuits shown in FIG. IV for measuring up traffic demans a timing condenser 50 of approximately 10 microfarads capacity serves as an accumulator in determining the average stopping time of the elevator cars at the intermediate landings and the number of passenger transfers per unit of time. The timing condenser 50 continually tends to discharge at a relatively slow rate by current flow from the condenser through a resistor 51 connected between the condenser and a common signal lead 52, at line 47, and thence through a discharge resistor 53 to a negative return lead 54. This discharging action takes place as long as the lead 52 is not connected in any way to a B+ lead maintained at a positive voltage. The lead 52 is connected to the B+ lead intermittently by way of a series of contacts comprising contacts MGF, at line 42, which for a particular car, are closed as long as the car is stopped at an intermediate floor; normally open contacts ULF which are closed as long as the car is conditioned for upward travel; and thence either through a high resistance charging resistor 55 connected directly to the lead 52 or through a series circuit comprising contacts PCT and PCT1 of the car photo timing relays PCT and PCT1 and a timing resistor 56 connected between the timing relay contacts and the lead 52. This combination of contacts and resistors connected between the B+ lead and the lead 52 is duplicated for each of the cars making up the bank of elevators.

The time constant of the condenser 50, which is conveniently made of approximately 10 microfarads capacity, and the resistor 51, which is in the order of 8 megohms, is in the order of 80 seconds. This time constant is affected by the effective resistance of the combination of the resistor 53 of 4 megohms and the resistors 55 and 56 which may be connected in the circuit. The overall time constant of the condenser 50 and its resistors is in the order of 100 seconds. Since this time is long compared to the brief intervals that the photocell timing relays complete the circuit through the resistor 56 and is also long compared to the time that a car may stop at an intermediate floor, it is apparent that the voltage developed across the condenser 50 represents a running average of the number of passenger transfers and the car stopping times.

It may be desirable under certain circumstances to make the circuit more responsive to increases in traffic demand than to decreases in such demand. Thus, if a diode rectifier 57, which may be a silicon diode, be connected between the condenser 50 and the lead 52 so as to pass current from the lead 52 into the condenser 50 and prevent reverse flow it is possible to charge the condenser 50 much more rapidly and keep the slow discharge rate. Thus, the circuit gives quicker response to increases in average stopping time and passenger transfers and a relatively slow response to decreases in such time and transfers.

The voltage developed across the timing condenser 50 is employed to operate a pair of program or pattern selecting relays PU and MU that are responsive to different voltage levels such that when neither relay is energized the system operates for intermittent night service. This condition is indicated by no up stopping time and no passenger entries or departures during up travel. These relays PU and MU shown in lines 48 and 50 of FIG. IV are sequentially operated in accordance with the voltage developed across the condenser 50. Thus, as the stopping time or passenger transfer time increases so as to deliver more current and build up a charge on the condenser 50 more rapidly than it is drained off through the discharging resistor 53 the relay MU is picked up when the traffic is of ordinary level and as the up traffic increases the up peak relay PU responds.

Since no current can be drained from the condenser 50 into the relay operating circuit an amplifier tube is included having its grid 58 connected directly to the condenser 50, having its plate 59 including screen and suppressor grids 60 and 61 connected to the B+ lead. Voltage is maintained on the B+ lead by means of a transformer secondary 62 and rectifier 63 connected between the return lead 54 and the B+ lead. A smoothing condenser 64 is also connected between these leads. Current flow through the tube in response to the voltage on the grid 58 is taken from its cathode 65 through an adjusting resistor 66 and the operating coils of the relays PU and MU and hence to the return lead 54.

In a typical four car elevator system the resistors 55, one for each car, are conveniently made of approximately 20 to 25 megohms each while the resistors 56 in the passenger counting circuits are conveniently made approximately four megohms each while the discharge resistor 53 is also of four megohms. The operating level at which the relays respond is adjusted by varying the magnitude of the resistor 66 so that the system changes programs at selected levels of traffic demand.

The principal advantage obtained by using the rectifier 57 is to delay the discharge of the condenser 50 and thus maintain the peak up or moderate up traffic program for a short time interval after the demand has subsided and thus prevent response to momentary decreases in demand. Without this control the system tends to change programs too often and thus leads to impairment of the service rendered by the system.

A similar system for measuring the down traffic demand is illustrated in FIG. V. Since this figure is nearly identical with FIG. IV only the differences will be described. These differences comprise a normally closed ULF contact at line 63 in place of the normally open ULF contact at line 43 which makes the system responsive to down stop time at intermediate floors whereas the other circuit was responsive to up stop time. Another difference is the inclusion of a three position switch 70 between the contacts ULF and the circuits leading to the 20 megohm resistor 71 in the charging circuit of the timing condenser the photocell timing relay contacts PCT and PCT1. The three position switch 70 is arranged so that in its central position both the charging resistor 71 and the series circuit through the timing relay contacts PCT and PCT1 are closed and the system is responsive both to the stopping time at the floors and to the number of passenger transfers. By moving the switch to its left hand position, clockwise as shown in FIG. V, the circuit is completed only through the charging resistor 71 so that the program selection depends only on the down trip stopping time at intermediate floors. By moving the switch to its counterclockwise position the circuit is completed only through the passenger counting circuit so that the system then is responsive only to the amount of down traffic and not to the time that it takes to serve such traffic.

While the circuits shown in FIGS. IV and V offer considerable flexibility in adjusting the system to meet traffic demands, situations may occur in which it is desirable to limit the passenger counting to passengers leaving the car rather than counting both entering and leaving passengers. The circuit shown in FIG. VI provides a direction sensing relay contact PH in series with the photocell timing relay contacts PCT and PCT1 so as to limit the counting of passengers to those that are leaving the car. This is accomplished by including, as shown in FIG. VI, a normally open contact of the direction sensing relay PH at line 84 in series with the timing relay contacts PCT and PCT1 so that this timing relay contact circuit can be completed only as a passenger leaves the car. This limits the response of the system in buildings having a large amount of interfloor traffic, that is, passengers getting on the car at one intermediate floor and leaving the car at another. Under such circumstances it is not desirable to count the passengers twice since that would indicate greater traffic demand than is existing. The inclusion of the direction sensing relay contacts corrects this particular type of difficulty.

This modification may be made in either of the circuits shown in FIGS. IV or V so as to prevent the indication or registration of a peak up or down traffic demand when actually there is a considerable amount of interfloor traffic.

Another situation that occurs, usually during the down peak traffic demand, is that the cars become bunched in their operation. By bunching is meant the accumulation of cars into a group rather than being distributed throughout their round trip. When such a situation occurs the circuits shown in FIG. VI or the circuits shown in FIGS. IV and V occasionally give erroneous results. This is because, when the cars are bunched particularly on down travel, the timing condenser becomes charged to a high voltage indicating a peak down demand and then when all of the cars stop at the main terminal to discharge their loads there is no current flow to maintain the charge on the condenser and it tends to discharge and may, before the cars again get to the upper floors and start picking up passengers, discharge to such an extent that the system transfers to a moderate down program even though a peak program is still in order. This undesirable result may be avoided by arranging the circuit as indicated in FIG. VII. In this arrangement charging resistors 75, one for each elevator, are connected through the contacts MGF in line 103 and contacts ULF in line 104 to provide charging current to a timing condenser 76 by way of a rectifier 77 or resistor 78. This circuit measures the average time that the cars are stopped at the various intermediate floors in picking up their passenger load. Since these circuits are in parallel a bunched condition of the various cars may result in a relatively high accumulated charge on the condenser 76 before the cars arrive at the lower terminal. This high voltage indicates the down peak traffic demand. To prevent losing this charge while passengers are leaving the car at the lower terminal a second circuit including main floor relay contacts MG at line 102, which are closed when the car is at the lower terminal, are included in series with direction sensing relay contacts PH in line 103 and the photocell timing relay contacts PCT and PCT1 in the parallel charging circuit to the condenser 76. Since the resistor in this latter charging circuit is relatively small, being in the order of four megohms this circuit by passing current according to the number of leaving passengers more than makes up for the loss in voltage that would otherwise occur while the car is being unloaded. The circuit may be adjusted to accumulate a sufficient charge on the condenser 76 to maintain the voltage during the up trip time and thus hold the program selection.

In the passenger counting circuits illustrated in the preceding figures the incremental charge delivered to the counting or timing condenser for each passenger transfer is determined by the supply voltage, the resistance included in series with the timing relay contacts, and the length of time that the circuit is completed. The accuracy of such a system depends largely upon the accuracy of timing of the timing relays. This may vary considerably according to the design and condition of the relay. An alternative circuit for performing the counting operation which does not depend upon the accuracy of the timing relays is illustrated in FIG. VIII. This circuit is similar to that shown in FIG. II except that a timing condenser 80, corresponding to the condenser 30 in FIG. II, is charged in fixed increments, in accordance with passenger transfers, by charge transferred from a smaller metering condenser 81. Like the circuit of FIG. II, the counting condenser 80 is discharged through normally closed contacts MG at line 126 when the car leaves the main floor. The metering condenser 81 is charged from a B+ lead in line 121 by way of normally open contacts MG that are closed when the car is at the terminal floor, normally open direction sensing relay contacts PH that are closed as long as passengers are leaving the car, normally open photocell timing relay contacts PCT1 at line 124 and a current limiting resistor 82 connected between the condenser 81 and return lead 83. When the photocell timing relay PCT1 is energized to close this circuit to the condenser 81, it also opens its contacts PCT1 at line 125 to disconnect the timing condenser 80 from the charging circuit. As soon as a passenger leaves the car so as to operate the photocell timing relay PCT1 it opens its contacts in line 124 to disconnect the incremental charging condenser 81 from the B+ lead and an instant later closes its contacts in line 125 to permit the charge in the condenser 81 to flow into the counting condenser 80. The rate of equalization of charge, the current flow, is controlled by the resistor 82, the sole function of which is to limit the current to and from the condenser 80 or 81 to a value that may be safely handled by the relay contacts. Ordinarily the metering condenser 81 is designed to have a capacity in the range of from one to five percent of the capacity of the timing condenser 80. This ratio is selected according to the desired counting capacity.

The voltage on the counting condenser 80 is applied through a lead 84 to a control grid 85 of a cathode loaded amplifier tube 86. Tube 86 has its plate 87 connected to the B+ lead and has its cathode 88 connected through a current limiting resistor 89 and an operating coil of a load dispatch relay PUL shown at line 128. The other side of the operating coil is connected to the return lead 83. It is immaterial in these circuits whether triode connected pentodes such as the tube 34 are used or whether ordinary triodes, such as the tube 86, are used.

In the circuit shown in FIG. I four relays were employed to detect the transfer of a passenger and the direction of the transfer. These included two relays that were operated directly by the photo-cell control circuits, a direction sensing relay, and an auxiliary relay operated in conjunction with one of the photocell responsive relays. Substantially the same functions may be accomplished in a somewhat similar manner using only three relays. The circuit for accomplishing this is illustrated in FIG. IX. In this arrangement a pair of radiant energy beams 100 and 101 are directed across the entrance to the elevator car so as to impinge on car and landing photocell controls PCCb and PCLb. The photocell controls PCCb and PCLb are, in combination with the radiant energy beams, passenger detecting means. The photocells may be responsive either to visible light or to invisible radiation, whichever may be more suitable for the particular installation. The two beams are shown as being transmitted and received by equipment on the elevator car and spaced apart with the car photocell assembly PCCb nearer the interior of the car and the landing photocell assembly PCLb adjacent the landing side of the car entrance. If desired the landing photocell system may be installed in the hallway door rather than on the car. However, this arrangement requires separate photocells and light sources for each floor, a very expensive arrangement. The car photocell control PCCb is arranged, when energized, to pass current from a positive direct current supply lead L-3 through leads 102 and 103 to a car photo relay PCb shown in line 133 of FIG. IX. The landing photocell control PCLb prepares a circuit through lead 104 from the positive supply lead L-3 as long as the landing photocell beam 101 is unobstructed. The lead 104 is connected through a parallel arrangement of normally open car photo relay contacts PCb in line 134 and landing photocell relay contacts PLb in line 135 to an operating coil of the landing photo relay PLb and thence to the return lead. In this arrangement the landing photo relay PLb can be energized from a nonenergized condition only in the event that the car photo relay PCb is energized and the landing photocell beam 101 is unobstructed. Once energized the landing photo relay PLb remains energized until the landing photo beam 101 is obstructed to open the contacts in the landing photo control PCLb. Thus the landing photo relay PLb may be deenergized by interrupting the beam 101 but cannot be reenergized until both beams are reestablished. A direction sensing relay PHb is provided at line 137 and is responsive to the sequence with which the beams 100 and 101 are broken. When both beams are established so that the car photo relay PCb and the landing photo relay PLb are both energized the direction sensing relay PHb is deenergized because the normally closed contacts PLb in line 137 are opened and the normally closed car photo relay contacts PCb in line 136 are also open. If one or more passengers are leaving the car such that the beam 100 is broken first thus deenergizing relay PCb to complete the circuit in line 136 the direction sensing relay PHb is energized as the first person leaves. As the departing passenger breaks the beam 101 and thus deenergizes the landing photo relay PLb it closes its contacts PLb in line 137 to hold the direction sensing relay PHb in its energized position until both beams are reestablished simultaneously. In order that the holding circuit to the direction sensing relay PHb may be maintained when the landing photo relay PLb operates the PLb contacts in lines 136 and 137 must be of the make-before-break variety so that there is no period when the circuit is open.

If the passenger or passengers are entering the car the landing photo beam 101 is broken first so that the landing photo relay PLb operates before the car photo relay PCb. In this situation the circuit in line 136 is opened at the PLb contacts before it can be closed by the subsequent dropping out of the car photo relay PCb and closure of the PCb contacts. Since the direction sensing relay PHb is deenergized and its contacts PHb in line 137 are open when the contacts PLb in line 137 close no circuit is established to the relay. Therefore, the direction sensing relay PHb cannot be energized until after the light beams have been simultaneously unobstructed to reenergize the landing photo relay PLb and the car photo relay is the first to operate on the next transfer.

In this circuit, as in the one shown in FIG. I, the direction of passenger movement through the doors is sensed by the sequence in which the light beams are broken and the sensed indication of direction is held until both of the light beams are again unobstructed. Thus the circuit holds the indication when several passengers follow each other so closely that, after the first interruption, one beam or the other is unobstructed momentarily but such that both are not simultaneously unobstructed until all of the passengers have left or entered. This system works satisfactorily because, as a practical matter there is always a short pause after the last of a departing group of passengers clears the beams before other passengers enter.

In order to minimize the response of the system to persons waving their hands across the light beams and thus registering improper counts the circuit in FIG. I is arranged with a timing relay that delays the response of the counting circuit for a predetermined time after the photocell beam is broken. The suggested time setting for the relay is such that a person waving his hand does not interrupt the beam long enough to permit the relay to time out whereas a person walking through the doorway at the normal rate of speed would interrupt the beam long enough to register a count. Similar protection against improper operation may be achieved by arranging the counting circuit so that it ignores any interruptions of the car photo light beam 100 and corresponding operations of the car photocell control PCCb unless the landing photo beam 101 is also interrupted. Since the beams are separated by a distance somewhat greater than the width of a person's hand this arrangement prevents any counting response to the interruptions of one beam at a time.

A circuit arrangement operating on this principle is illustrated in FIG. X. In this arrangement, which is similar to that shown in FIG. VIII, a charging condenser 110 is charged from a B+ lead in line 142 by way of normally open contacts MGb that are closed when the car is at the main floor, normally closed direction sensing relay contacts PHb that are closed as long as persons are entering the car, normally open car photo relay contacts PCb, and a current limiting resistor 113 connected to the return lead 112. The charging condenser 110 is kept in a charged condition ready to transfer a count as soon as conditions indicate that a count should be registered. The charge on the condenser 110 is transferred to or equalized with the charge in a counting condenser 111 as soon as the car and landing photo relays PCb and PLb are both deenergized so as to open the contacts PCb in line 145 and to close their contacts at lines 146 and 147 to complete a circuit from the charging condenser 110 through the now closed contacts to the condenser 111. The circuit is completed by way of the return lead 112 and the current limiting resistor 113.

As in the other circuit the voltage on the counting condenser 111 is applied to a cathode loaded amplifier 114 the cathode current of which is fed to an operating coil of a loaded car dispatch relay PUL shown in line 148. As soon as the car leaves the main floor in response to a dispatching signal or in response to other controls the main floor relay MG is deenergized thereby closing its contacts MGb at line 148 to complete a discharge circuit for the counting condenser 111. This insures that the condenser 111 will be fully discharged in readiness for another counting sequence as the car arrives at the main terminal on its return trip.

The program or pattern of operation of the elevator system may be varied in accordance with the passenger demand by measuring the transfer time of passengers entering or leaving the elevator cars and using that transfer time either alone or in conjunction with the time that the car stands at the intermediate floors as the criterion for program selection. Circuits operating according to this aspect of the invention are illustrated in FIGS. XI and XII. In the circuits shown in FIG. XI for measuring up traffic demands a timing condenser 350 of approximately 10 microfarads capacity serves as an accumulator in determining the average stopping time of the elevator cars at the intermediate landings and the transfer time of passengers entering or leaving at the intermediate landings. The timing condenser 350 continually tends to dsicharge at a relatively slow rate by current flow from the condenser through a resistor 351 connected between the condenser and a common signal lead 352, at line 168, and thence through a discharge resistor 353 to a negative return lead 354. This discharging action takes place as long as the lead 352 is not connected in any way to a B+ lead maintained at a positive voltage. The lead 352 is connected to the B+ lead intermittently by a series of contacts comprising contacts MGF at line 163, which for a particular car, are closed as long as the car is stopped at an intermediate floor; normally open ULF contacts which are closed as long as the car is conditioned for upward travel; and thence through a high charging resistor 355 or through a series circuit comprising contacts PC and PCT at lines 166 and 167 of the car photocell and the car photo timing relays PC and PCT, respectively, and a timing resistor 356 connected between the timing relay contact PCT and the lead 352.

The time constant of the condenser 350, which is conveniently of approximately 10 microfarads capacity, and the resistor 351, which may be of the order of 8 megohms, is in the order of 80 seconds. This time constant is affected by the effective resistance of the combination of the resistor 353 of 4 megohms and the resistors 355 and 356 which may be connected in the circuit. The overall time constant of the condenser 350 and its resistors is in the order of 100 seconds. Since this time is long compared to the brief intervals that the photocell and photo timing relay complete the circuit through the resistor 356 and is also long compared to the time that a car may stop at an intermediate floor it is apparent that the voltage developed across the condenser 50 represents a running average of the transfer times of the passengers and the car stopping times.

The back contacts PC in line 166 represent transfer time of passengers, since the photocell relay PC is dropped out when the energizing beam 18 is interrupted by one or more passengers. This becomes important when the doorway is wide enough to accommodate more than one passenger abreast making it impossible to count the individual passengers as described above. The normally open photo timing relay contacts PCT are included in the series circuit with the back contacts PC to insure that the charge on the condenser 350 doesn't rise to a non-proportionate value by a failure in the system which would thereby allow the PC back contacts to stay closed all the time. That is, the photo timer relay PCT is energized by the closure of PCT1 contacts at line 13, the PCT1 relay being energized in turn by the closure of PC contacts at line 11. However, the timer relay PCT has a slow drop out time and will open the contacts PCT in line 167 only if the PC relay has been deenergized for quite a length of time, such as by a failure.

It is to be noted that the combination of contacts between the B+ lead and the lead 352 is to be duplicated for each of the cars making up the bank of elevators. As was explained hereinbefore, if a diode 357, which may be a silicon diode, be connected between the condenser 350 and the lead 352 so as to pass current from the lead 352 into the condenser 350 and prevent reverse flow it is possible to charge the condenser 350 much more rapidly and keep the slow discharge rate. Thus the circuit gives quicker response to increases in average stopping time and transfer time of the passengers and a relatively slow response to decreases in said times.

In a manner as explained hereinbefore, the voltage across the timing condenser 350 is employed to operate a pair of program or pattern selecting relays PU and MU at lines 169 and 170.

A similar system for measuring transfer time on down traffic demand is illustrated in FIG. XII. The only difference between FIG. XII and FIG. XI is that back contacts ULF of the up direction signal relay ULF are utilized at line 184 in place of the front contacts ULF in the series circuit including the intermediate floor stop time relay MGF. Thus, when the car is conditioned to travel downward the back contacts ULF at line 184 of FIG. XII are closed enabling the circuit to measure stop time at intermediate floors and the transfer time of passengers entering and leaving the car at those floors. In addition down program or pattern selecting relays PD and MD are substituted at lines 189 and 190 for the up program or pattern selecting relays PU and MU of FIG. XI. Again, it is to be understood that the combination of contacts and resistors connected between the B+ lead and the lead 352 of FIG. XII is duplicated for each of the cars making up the bank of elevators.

It is desirable to measure time of passenger transfer at the dispatching terminals plus whether the passengers are entering or leaving. If the car is conditioned for up travel then the transfer time of passengers as they are entering the elevator is of significance in establishing up programs or pattern selections. A circuit for accomplishing this result is illustrated in FIG. XIII. Since the circuit of FIG. XIII is similar with the circuit of FIG. XI only the differences will be described. The circuit of FIG. XIII may retain the series circuit including the intermediate floor stop time relay contacts MGF and the up direction signal relay front contacts ULF at lines 203 and 204 with operation as described hereinbefore. However, since the measurement of any activity at the dispatching terminals necessarily means that the MGF front contacts are open, a separate series circuit utilizing back contacts of the MGF relay or front contacts MG of a relay indicating location of the car at a dispatching terminal should be utilized.

As shown in FIG. XIII a separate series circuit, including the normally open front contacts MG, back contacts of the direction sensing relay PH, and back contacts of the photocell relays PC and PL, is utilized. When the car is at the dispatching terminal represented by the MG contacts in line 203 the MG contacts are closed. As explained hereinbefore the direction sensing relay PH is energized only by the exit of passengers and is dropped out by entering passengers. Therefore, the circuit of FIG. XIII would measure stop time at intermediate floors through the MGF and ULF contacts while the car is conditioned to travel up, would measure the transfer time of entering passengers while the car is at a terminal floor, and would operate the up program or pattern selecting relays PU and MU in lines 209 and 210 accordingly. As hereinbefore stated the combination of relays between the B+ lead and the lead 352 in FIG. XIII would be duplicated for each car making up the bank of elevators.

A circuit, similar to the circuit of FIG. XIII, is shown in FIG. XIV which will measure the stop time of a car at intermediate floors when conditioned for down travel and which will measure the transfer time of passengers leaving the car when the car is at a terminal floor. Since the circuit is similar to FIG. XIII only the differences will be explained. An up signal direction relay back contact ULF is utilized in the series circuit with the intermediate floor stop time relay contacts MGF so that stop time at intermediate floors is measured only when the car is conditioned for down travel. Direction sensing relay PH front contacts at line 224 are utilized instead of back contacts as in FIG. XIII so that transfer time of passengers leaving the car at a terminal floor is measured by the series circuit including the MG, PC, and PL contacts, whose operation has been explained above. These circuits cooperate to control the down program or pattern selecting relays PD and MD at lines 229 and 230 in the manner hereinbefore described.

In FIG. XIV as in FIGS. XI through XIII the combination of contacts shown between the B+ lead and the lead 352 is to be duplicated for each car making up the bank of elevators.

The various circuits illustrated in the figures provide means for sensing the passage of passengers into or from an elevator car and provide means for controlling the operation of a group of cars and the dispatching of single cars in accordance with passenger demand. By this measurement of passenger demand it is also possible to select operating programs for a group of cars to provide the best possible service for the current demand.

Various modifications may be made in the various circuits without departing from the spirit or scope of the invention.

Having described the invention, I claim:

1. In an elevator system, having a plurality of cars and means for operating the cars according to any of several programs to meet various traffic demands, in combination, means for transmitting at least one beam of radiant energy across the doorway of each car, means responsive to interruptions of the beam of radiant energy as load transfer to or from the cars occurs, and a counting circuit responsive to time and said interruption responsive means, said counting circuit being adapted to select an operating program in accordance with the time rate of load transfers.

2. In an elevator system having a plurality of cars and means for operating the cars according to a plurality of patterns to serve varying traffic demands, in combination, means for detecting individual passenger transfers, means for producing a signal generally proportional to the number of transfers per interval of time, and means for selecting predetermined individual patterns of said plurality of patterns of operation in accordance with predetermined magnitudes of said signal.

3. In an elevator system having a plurality of cars and means for operating the cars according to various operational patterns to serve various traffic demands, in combination, means for generating a signal generally proportional in magnitude to the average time the cars stand at intermediate floors for passenger transfer, means for augmenting said signal in proportion to the number of passenger transfers at said floors, and means for selecting an operational pattern in accordance with the magnitude of said augmented signal.

4. In an elevator system having a plurality of cars and means for operating the cars, in combination, means for dispatching the cars from a floor at generally regular intervals of time, means for accelerating the dispatch interval, and means responsive to the number of passenger entries into a car for activating said dispatch accelerating means.

5. In an elevator system having a plurality of cars and means for operating the cars according to various operational patterns to serve various traffic demands, in combination, means responsive to the direction and number of passenger transfers for each of the elevator cars, means responsive to the transfer responsive means for generating a signal corresponding generally to the average time rate of transfer of passengers, and means for selecting operational patterns according to the magnitude of said signal.

6. In an elevator system having a plurality of cars and means for operating the cars according to various operational patterns to serve various traffic demands, means for determining the direction of passenger transfers comprising, in combination, a pair of passenger detecting means arranged in tandem in the entrance to a car to be successively actuated by the passage of a passenger, selecting means operable in response to a predetermined order of actuation of said detecting means, said selecting means being arranged to maintain its selection as long as at least one of said detecting means is actuated.

7. In an elevator system having a plurality of cars and means for operating the cars according to various operational patterns to serve various traffic demands, means for determining the direction and number of passenger transfers comprising, in combination, a pair of passenger detecting means arranged in tandem in the entrance to a car to be successively actuated by the passage of a passenger, counting means responsive to the operation of one of the detecting means, for indicating the number of transfers, direction indicating means responsive to a predetermined order of actuation of the detecting means, and means for maintaining said direction means for determining the direction and number of passensing means in direction indicating condition as long as either detecting means is actuated.

8. In an elevator system having a plurality of cars and means for operating the cars according to various operational patterns to serve various traffic demands, means for determining the direction of passenger transfers comprising, in combination, means for projecting a pair of generally parallel radiant energy beams across the entrance to a car, means individually responsive to the interruption of said beams, means responsive to the sequence of operation of the interruption responsive means, and means for maintaining the condition of the sequence responsive means assumed after the first interruption as long as at least one of said beams is interrupted.

9. In an elevator system according to claim 8, counting means actuated by at least one of the beam interruption responsive means.

10. In an elevator system having a plurality of cars and means for operating the cars according to various operational patterns to serve various traffic demands, means for determining the number of passenger transfers comprising, in combination, passenger detecting means at the entrance to an elevator car, a time delay relay responsive to actuation of the detecting means, a counting circuit responsive to operations of the time delay relay and to time, and means for selecting operational patterns in accordance with the count accumulated in said counting circuit.

11. In an elevator system having a plurality of cars and means for operating the cars according to various operational patterns to serve various traffic demands, means for measuring the traffic demand comprising, in combination, a pair of passenger detecting means arranged at the entrance to a car in position to be sequentially operated by entrance or exit of passengers, means responsive to the sequence of operation of the detecting means for indicating the direction of passengeer transfer, and a counting circuit responsive to simultaneous operation of the detecting means.

12. In an elevator system having a plurality of cars and having a means for operating the cars according to various operational patterns to serve various traffic demands, in combination, a pair of passenger detecting means arranged at the entrance to a car in position to be sequentially operated by departing passengers, means for generating a signal that varies according to the stopping time at intermediate floors, means for augmenting said signal according to the passenger detecting means while the car is at a lower terminal floor, and means for selecting a down peak program of operation when said signal exceeds a predetermined level.

13. In an elevator system having a plurality of cars and having means for operating the cars according to various operational patterns to serve various traffic demands, in combination, a pair of passenger detecting means arranged at the entrance to a car in position to be sequentially operated by entering passengers, means responsive to said detecting means for generating a signal proportional to the number of passengers entering at a terminal floor, means for augmenting said signal according to the standing time at intermediate floors, and means for selecting an up peak program when said signal reaches a predetermined magnitude.

14. In an elevator system having a plurality of cars and having means for operating the cars according to various operational patterns to serve various traffic demands, in combination, a pair of passenger detecting means arranged at the entrance to a car in position to be sequentially operated by entering passengers, means responsive to said detecting means, and to car position for generating a signal proportional to the number of passengers entering at a terminal floor, and means responsive to said signal for selecting an up peak operational pattern when said signal reaches a predetermined magnitude.

15. In an elevator system having a plurality of cars and having means for operating the cars according to various operational patterns to serve various traffic demands, in combination, a pair of passenger detecting means arranged at the entrance to a car in position to be sequentially operated by departing passengers, means responsive to car position and the detecting means for generating a signal proportional to the number of passenger departures, and means for selecting a down peak operational pattern when said signal reaches a predetermined magnitude.

16. In an elevator system having a plurality of cars and having means for operating the cars according to various operational patterns to serve various traffic demands, in combination, means for detecting the passage of passengers through a car door, means for generating a signal that varies according to the stopping time at floors above the lower terminal while the car is conditioned for upward travel, means responsive to the detecting means for augmenting said stopping time signal according to the number of passenger transfers, and means for selecting an up peak program of operation when said signal exceeds a predetermined level.

17. In an elevator system having a plurality of cars and having means for operating the cars according to various operational patterns to serve various traffic demands, in combination, means for detecting the passage of passengers through the car door, car travel direction determining means, counting means responsive to said detecting means and said direction determining means for generating a signal proportional to the number of passenger transfers during upward travel of the car, and means for selecting an up peak program of operation when said signal exceeds a predetermined level.

18. In an elevator system having a plurality of cars and having means for dispatching the cars from a lower terminal, in combination, dispatch accelerating means, means responsive to the load in the car for operating said dispatch accelerating means, means for disabling said load responsive means as the car arrives at the lower terminal, and means for detecting the direction of passenger transfers through the elevator door, said passenger detecting means being connected to enable said load responsive means in response to the entrance of a passenger.

19. In an elevator system having a plurality of cars and means for operating the cars according to various operational patterns to serve various traffic demands, in combination, means for generating a signal generally proportional in magnitude to the average time the cars stand at intermediate floors, means for augmenting said signal in proportion to the transfer time of passengers at said floors, and means for selecting an operational pattern in accordance with the magnitude of said augmented signal.

20. In an elevator system having a plurality of cars and means for operating the cars according to various operational patterns to serve various traffic demands, in combination, means for generating a signal generally proportional in magnitude to the average time the cars stand at intermediate floors, means for augmenting said signal in proportion to the transfer time of passengers at a terminal floor, and means for selecting an operational pattern in accordance with the magnitude of said augmented signal.

21. In an elevator system having a plurality of cars and means for operating the cars according to various operational patterns to serve various traffic demands, in combination, means for generating a signal generally proportional in magnitude to the average time the cars stand at intermediate floors, means for augmenting said signal in proportion to the transfer time of passengers at a terminal floor, means for differentiating between the transfer time of entering and exiting passengers at said terminal floor, and means for selecting an operational pattern in accordance with the magnitude of said augmented signal.

22. In an elevator system having a plurality of cars serving a plurality of floors and means for operating the cars according to various operational patterns to serve various traffic demands, in combination, means for generating a signal generally proportional in magnitude to the transfer time of passengers at said floors, and means for selecting an operational pattern in accordance with the magnitude of said signal.

23. In an elevator control, a plurality of cars serving a plurality of floors, means measuring traffic demand comprising means measuring the stop time of said cars at intermediate floors and means measuring the transfer time of passengers at said intermediate floors, and means responsive to a predetermined traffic demand for initiating a predetermined pattern of operation of said cars.

24. In an elevator control, a plurality of cars serving a plurality of floors, means measuring traffic demand comprising means measuring the transfer time of passengers at said floors, and means responsive to a predetermined traffic demand for initiating a predetermined pattern of operation of said cars.

25. In an elevator control, a plurality of cars serving a plurality of floors, means measuring traffic demand comprising means measuring the transfer time of passengers at a terminal floors, and means responsive to a predetermined traffic demand for initiating a predetermined pattern of operation of said cars.

26. In an elevator control, a plurality of cars serving a plurality of floors, means measuring traffic demand comprising means measuring the transfer time of passengers at a terminal floor, means differentiating between the transfer time of entering and exiting passengers at said terminal floor, and means responsive to said traffic demand for altering the pattern of operation of said cars.

27. In an elevator control, a plurality of cars serving a plurality of floors, means measuring traffic demand comprising means measuring the stop time of cars at intermediate floors and means measuring the transfer time of passengers at a terminal floor, means differentiating between the transfer time of entering and exiting passengers at said terminal floor, and means responsive to said traffic demand for altering the pattern of operation of said cars.

28. In an elevator system having a plurality of cars serving a plurality of floors including a dispatching floor, means for counting the number of passenger transfers at said dispatching floor and means for issuing a dispatch signal to a car present at the dispatching floor in response to a predetermined level of passenger transfer.

29. In an elevator system having a plurality of cars and means for operating the cars according to a plurality of operating patterns to satisfy service requirements imposed upon said system, means for measuring the number of passenger transfers at a selected floor, means for measuring the time the elevators are stopped to collect passengers during their trips, means for comparing said measurements with elapsed time and means for selecting operating patterns in accordance with said comparison.

30. In an elevator system having a plurality of cars and means for operating the cars according to a plurality of operating patterns to satisfy service requirements imposed upon the system, means for measuring the number of passenger transfers and the time consumed in effecting such transfers, means for comparing said measurement with the elapsed time during the measurement and means for establishing a traffic program in accordance with said comparison.

References Cited in the file of this patent

UNITED STATES PATENTS

| | | |
|---|---|---|
| 2,847,089 | Santini | Aug. 12, 1958 |
| 2,938,604 | O'Grady | May 31, 1960 |

UNITED STATES PATENT OFFICE
CERTIFICATE OF CORRECTION

Patent No. 3,065,823                      November 27, 1962

Raymond A. Burgy

It is hereby certified that error appears in the above numbered patent requiring correction and that the said Letters Patent should read as corrected below.

Column 7, line 52, for "demans" read -- demands --; column 16, line 20, strike out "means for determining the direction and number of pas-".

Signed and sealed this 5th day of May 1964.

(SEAL)
Attest:
ERNEST W. SWIDER

Attesting Officer

EDWARD J. BRENNER
Commissioner of Patents